(12) United States Patent
Woldegergis et al.

(10) Patent No.: US 10,945,822 B2
(45) Date of Patent: Mar. 16, 2021

(54) METHODS FOR PRODUCING A LABORATORY ANALOGUE FOR DENTAL IMPLANTS

(71) Applicant: Heraeus Kulzer GmbH, Hanau (DE)

(72) Inventors: Yohannes Woldegergis, Hanau (DE); Stefan Hormann, Waechtersbach (DE); Helmut Redemann, Frankfurt am Main (DE); Uwe Boehm, Hanau (DE)

(73) Assignee: HERAEUS KULZER GMBH, Hanau (DE)

( * ) Notice: Subject to any disclaimer, the term of this patent is extended or adjusted under 35 U.S.C. 154(b) by 1040 days.

(21) Appl. No.: 15/401,405

(22) Filed: Jan. 9, 2017

(65) Prior Publication Data

US 2017/0112602 A1 Apr. 27, 2017

Related U.S. Application Data

(62) Division of application No. 13/910,451, filed on Jun. 5, 2013, now abandoned.

(30) Foreign Application Priority Data

Jun. 6, 2012 (DE) ...................... 10 2012 011 238.6

(51) Int. Cl.
*A61C 13/34* (2006.01)
*B33Y 10/00* (2015.01)
(Continued)

(52) U.S. Cl.
CPC ............ *A61C 13/34* (2013.01); *A61C 8/0001* (2013.01); *A61C 9/0053* (2013.01);
(Continued)

(58) Field of Classification Search
CPC . A61C 13/34; A61C 13/0004; A61C 13/0006; A61C 8/0001; B33Y 80/00; Y10T 29/49567
(Continued)

(56) References Cited

U.S. PATENT DOCUMENTS 4,478,580 A 10/1984 Barrut
5,015,183 A 5/1991 Fenick
(Continued)

FOREIGN PATENT DOCUMENTS

DE 102007029105 A1 12/2008
EP 2389891 A2 11/2011
(Continued)

OTHER PUBLICATIONS

Search Report dated Nov. 28, 2013 in EP Application No. 13170635.0.
Search Report dated Mar. 28, 2014 in DE Application No. 10 2012 011 238.6.

Primary Examiner — Jeffrey M Wollschlager
Assistant Examiner — Armand Melendez
(74) Attorney, Agent, or Firm — Norris McLaughlin, P.A.

(57) ABSTRACT

Method for producing a three-dimensional model of at least a partial jaw comprising: fully-automatic shaping of at least one recess for accommodating a laboratory analogue into the alveolar ridge of the model using three-dimensional scanning data and shaping the depth, position, and orientation of the at least one recess such that the crestal end of the laboratory analogue inserted into said recess coincides with the crestal end of the dental implant in the jaw; or fully-automatic shaping of at least one vestibular, lingual or palatinal feed-through through the model into the at least one recess using three-dimensional scanning data and arranging the feed-through such that the crestal end of a laboratory analogue coincides with the crestal end of the
(Continued)

dental implant in the jaw when the laboratory analogue is fixed in place with a pin inserted through the feed-through in the model into an opening in the laboratory analogue.

16 Claims, 8 Drawing Sheets

(51) Int. Cl.
*A61C 8/00* (2006.01)
*A61C 9/00* (2006.01)
*A61C 13/00* (2006.01)
*B33Y 80/00* (2015.01)
*B29L 31/00* (2006.01)

(52) U.S. Cl.
CPC ...... *A61C 13/0004* (2013.01); *A61C 13/0006* (2013.01); *B33Y 10/00* (2014.12); *B29L 2031/7536* (2013.01); *B33Y 80/00* (2014.12); *Y10T 29/49567* (2015.01)

(58) Field of Classification Search
USPC .......................................................... 433/213
See application file for complete search history.

(56) References Cited

U.S. PATENT DOCUMENTS

| | | |
|---|---|---|
| 5,350,297 A | 9/1994 | Cohen |
| 5,630,717 A | 5/1997 | Zuest et al. |
| 7,059,856 B2 | 6/2006 | Marotta |
| 7,069,856 B2 | 7/2006 | Hartka et al. |
| 2006/0121408 A1* | 6/2006 | Hedge .................. A61C 9/0046 433/53 |
| 2008/0153067 A1* | 6/2008 | Berckmans .......... A61C 8/0089 433/213 |
| 2011/0129800 A1* | 6/2011 | Marotta ................ A61C 8/0001 433/213 |
| 2011/0294093 A1 | 12/2011 | Herweg et al. |
| 2012/0135373 A1 | 5/2012 | Cheng et al. |
| 2012/0135380 A1 | 5/2012 | Palti |

FOREIGN PATENT DOCUMENTS

| | | |
|---|---|---|
| WO | 2009024838 A2 | 2/2009 |
| WO | 2009055211 A1 | 4/2009 |
| WO | 2010115443 A1 | 10/2010 |

* cited by examiner

METHODS FOR PRODUCING A LABORATORY ANALOGUE FOR DENTAL IMPLANTS

This application is a division of U.S. patent application Ser. No. 13/910,451, filed Jun. 5, 2013, which claims foreign priority benefit under 35 U.S.C. § 119 of the German Patent Application No. 10 2012 011 238.6, filed Jun. 6, 2012, the disclosures of which are incorporated herein by reference.

The invention relates to methods for producing a laboratory analogue using three-dimensional scanning data of the oral space of the patient, whereby the data was recorded previously.

The invention also relates to methods for producing a three-dimensional model of at least a partial region of a jaw of a patient for at least one laboratory analogue having at least one recess for accommodating at least one laboratory analogue using three-dimensional scanning data of the oral space of the patient, whereby the data was recorded previously.

And lastly, the invention also relates to a laboratory analogue and a model produced using said method.

Dental implants are used in dental medicine to replace teeth that have fallen out or were extracted. Dental implants are inserted into the jaw bone for this purpose. Dental implants to be inserted into the jaw bone are known from DE 10 2007 029 105 A1. The dental implant comprises a cylindrical bore hole having an internal thread. Moreover, the dental implant is structured to have marks that are designed to ensure that the superstructure cannot be inserted into the dental implant at arbitrary angles.

Laboratory analogues are needed to allow a dental technician to carve a restoration on an implant superstructure in the laboratory for later insertion in the patient. For this purpose, laboratory analogues have a material-specific geometry and shape. In most cases, an impression is taken with an impression compound for this purpose and subsequently used to fabricate a plaster model of the jaw of the patient by casting plaster into the impression. The laboratory analogue becomes integrated into the model of the jaw in the appropriate position during this process. The geometry and shape of the laboratory analogue need to be matched to the plaster for this purpose. Said model of the jaw with the integrated laboratory analogue is then used by the dental technician to shape the implant superstructure and the dental restoration to match the situation existing in the oral space of the patient.

Another method for providing a model of the jaw and the incorporation scenario has been in use for some time instead of said method. It involves the use of, e.g., an intraoral scanner to first record the three-dimensional situation in the oral space of the patient and storing this digital information in electronic memory of a computer. Most often, CAD programmes are used for this purpose. Subsequently, a model of the jaw is generated in known manner using a light-curing plastic material and a laser. The laboratory analogues are then inserted into said plastic models of the jaw. In turn, the plastic model of the jaw harbouring the laboratory analogue can then be used by the dental technician to build up the dental restoration.

A disadvantage of this procedure is that the incorporation situation is not exactly defined for the dental technician on the jaw model. In particular where superstructures need to be fixed to multiple dental implants in the jaw of the patient, undesired tension may be produced in the jaw bone if the position and the orientation of the laboratory analogues in the model do not match the situation in the oral space to a sufficiently accurate degree. This can cause the patient pain and can put stress on the jaw bone which may lead to implant loss in the worst case. For this reason, it is crucial as early as during the production of the model and the positioning and orientation of the laboratory analogues with respect to each other to carry out all steps at the highest accuracy possible.

If the dental restoration inserted by the dentist does not exactly match the situation in the oral space of the patient, the dentist may need to adapt the dental restoration on site or, in the worst case, have the entire dental restoration re-fabricated. Moreover, the laboratory analogue is not all that easy to affix in the proper position such that there may some changes of position during the production of the dental restoration resulting in incorrect fitting of the dental restoration. This is the case, because the laboratory analogue is arranged on the model such that it can rotate and shift in its longitudinal direction.

Accordingly, it is the object of the invention to overcome the disadvantages of the prior art. Specifically, a way is to be devised that allows a model of the jaw or a laboratory analogue, in particular a plastic model of the jaw fabricated through rapid prototyping, with laboratory analogues inserted for producing a dental restoration to be produced at the highest possible accuracy such that there is less scrap during the production of the dental restoration and such that the dentist inserting the dental restoration has to carry out fewer or no additional adaptations. Moreover, modern methods should be usable in the production of the model of the jaw.

The method-related object of the invention is met through a method for producing a laboratory analogue for dental implants comprising the steps of:

providing at least one sleeve comprising a cylindrical depression having an internal thread;

providing a three-dimensional model of at least a partial region of the jaw of a patient who harbours at least one dental implant;

inserting at least one sleeve into at least one recess of the model matching the sleeve, whereby each recess is arranged in a region of the model, in which a dental implant is arranged in the jaw of the patient; and fully-automatic ablation of at least one inserted sleeve, whereby the ablation is controlled through three-dimensional scanning data of the oral space of the patient, whereby the data was recorded previously, and the sleeve is ablated based on such data to the extent that the crestal end of the laboratory analogue produced from said sleeve coincides with the crestal end of the dental implant in the jaw of the patient.

In this context, the invention can provide the sleeve to be ablated, in particular cut, ground and/or milled off, proceeding from crestal direction.

The method-related object of the invention is also met by a method for producing a three-dimensional model of at least a partial region of a jaw for producing a dental restoration, comprising the steps of:

providing three-dimensional scanning data of an oral space of a patient, who harbours at least one dental implant, whereby the data was recorded previously;

preparing a three-dimensional model of at least said partial region of the jaw; and fully-automatic shaping of at least one recess for accommodating a laboratory analogue into the alveolar ridge of the model, whereby the three-dimensional scanning data is used in the shaping and the depth, position, and orientation of the at least one recess are shaped such that the crestal end of the laboratory analogue inserted into said recess coincides with the crestal end of the dental implant in the jaw of the patient.

In this context, the invention can provide the laboratory analogue, in particular a standard laboratory analogue, is to be inserted into the recess or a sleeve is to be inserted into said recess, whereby a laboratory analogue is produced from the sleeve through ablation, whereby it is preferably to use the three-dimensional scanning data in order to ablate the sleeve fully-automatically.

This method allows the advantages of a method according to the invention for producing the laboratory analogue and having the recess in the model to be combined.

Moreover, the method-related object of the invention is met by a method for producing a three-dimensional model of at least a partial region of a jaw for producing a dental restoration, comprising the steps of:

providing three-dimensional scanning data of an oral space of a patient, who harbours at least one dental implant, whereby the data was recorded previously;

preparing a three-dimensional model of at least a partial region of the jaw with at least one recess for accommodating a laboratory analogue having an opening, whereby each recess is arranged in a region of the model, in which a dental implant is arranged in the jaw of the patient; and fully-automatic shaping of at least one vestibular, lingual or palatinal feed-through through the model into the at least one recess, whereby the three-dimensional scanning data are used in the shaping and the feed-through is arranged such that the crestal end of a laboratory analogue coincides with the crestal end of the dental implant in the jaw of the patient when the laboratory analogue is fixed in place with a pin that is inserted through the feed-through in the model into an opening in the laboratory analogue.

In this context, the invention can provide the feed-through to be shaped to match the pin and the opening to match the pin, preferably in that a depression in the laboratory analogue arranged downstream of the opening matches the pin.

Moreover, methods according to the invention for producing models can provide the fully-automatic shaping to proceed by means of drilling, turning, grinding, cutting out and/or milling.

Said production methods can be implemented in particularly precise and efficient manner through the use of fully-automatic computer-supported methods.

The invention can also provide the fully-automatic shaping and/or ablation, which is preferably carried out in computer-supported manner, to be carried out at an accuracy of at least ±10 µm, preferably at an accuracy of at least ±5 µm.

Said accuracy is sufficient to allow the abutments, abutment superstructures, and other superstructures to be attached to the dental implants without any tension arising. Moreover, at the specified accuracies, the scan of the oral space can be carried out with known methods without any major effort.

Moreover, the invention can provide the three-dimensional scanning data of the oral space of the patient to be used in the production, in particular fully-automatic production, of the three-dimensional model of the jaw or region of the jaw, whereby the model is preferably produced by means of rapid prototyping (rapid model construction), particularly preferably at an accuracy of at least ±100 µm, yet more preferably at an accuracy of at least ±60 µm.

Combining the easy and inexpensive production of the model with the refinement attained through fully-automatic ablation of the sleeve or shaping of the recess or feed-through results in a method that is rapid and as inexpensive as possibly and concurrently offers high accuracy and a precise starting position for the dental technician.

Another refinement of the invention can provide for the use of a CAD-based stereolithographic method to obtain the data for production of the model and/or laboratory analogue, and for the model to preferably be fabricated from plastic material, particularly preferably from a light-curing plastic material.

In this context, the previously recorded scanning data of the oral space of the patient can be used again and it is feasible to almost fully automate the production of the model with the laboratory analogue or laboratory analogues.

Particularly preferably, the invention provides for the use of a five-axis processing, in particular a five-axis CNC milling machine, in the shaping and/or ablation, in particular for milling and/or grinding.

The five-axis processing enables better accuracy during the processing than rapid prototyping and thus leads to improved models.

Moreover, the invention can provide at least two recesses to be generated or to exist in the three-dimensional model and preferably one sleeve each or one laboratory analogue each to be inserted into each of the recesses, whereby the position of the recess or feed-throughs and/or crestal ends of the laboratory analogues with respect to each other are adjusted by means of shaping and/or ablating based on the scanning data.

The advantages of the invention are implemented in particular if multiple laboratory analogues are used to build up a superstructure to be attached to multiple dental implants, since the method allows especially the position and orientation of the laboratory analogues with respect to each other to be adjusted very accurately.

Moreover, the invention can provide at least one cylindrical or conical recess to be generated or to exist in said model, whereby the recess is generated or exists to have one-fold or n-fold rotational symmetry about the longitudinal axis of the recess, and a sleeve or a laboratory analogue with the same rotational symmetry, at least over regions thereof, to be inserted into the recess such that it fits in the recess only in one orientation or in the n-fold orientation.

This serves to always attach the superstructures and/or abutments in the correct position in the model and, later, on the dental implants in the oral space.

In this context, the invention can provide that at least one sleeve or one laboratory analogue is used which preferably fits in the recess in a perfect fit.

Methods according to the invention can also be characterised in that the at least one recess is predefined during the production of the model to have a fixed defined shape that fits a certain shape of a sleeve or laboratory analogue, and/or a shape of the recess to be selected from a multiplicity of different shapes that match a multiplicity of different sleeves or laboratory analogues, whereby the shape is integrated into a measured virtual digitised jaw model as recess preferably before the model is produced.

The invention can just as well provide at least one sleeve or at least one laboratory analogue to snap-in into counter-snap-in locking means by means of snap-in locking means or is connected through a bayonet closure in an angled depression of at least one recess.

The longitudinal axis of the recess is the axis along which the laboratory analogue can be introduced into or removed from the recess. It usually coincides with the central axis of the recess. A crestal direction shall be understood to mean a direction from the alveolar ridge of premolar teeth in occlusal direction, i.e. toward the mastication surface. Direction information such as vestibular (towards the oral vestibule), lingual (on the tongue side of the mouth in case of the lower jaw), and palatinal (on the cheek side in the mouth in case of the upper jaw) also refers to the jaw.

Referring to one-fold rotational symmetry axes, reference is made to the one-fold rotational symmetry axis that coincides with the rotational symmetry axis of the cylindrical or conical basic shape of the sleeve and/or laboratory analogue. In most cases, a cylindrical or conical shape is selected as the basic shape of the laboratory analogue and thus of the recess, whereby grooves, depressions or projections break the symmetry of said basic shape. Accordingly, the rotational symmetry axis of the basic shape is to be seen as the symmetry axis.

Moreover, the invention can provide for a CAD-based stereolithographic method to be used for producing the model and the model to preferably be fabricated from plastic material, particularly preferably from a light-curing plastic material.

Said methods are particularly well-suited for implementing methods according to the invention since the recesses can thus be integrated very easily and without major computation into the jaw models even with simple, easily obtainable computers.

The invention can just as well provide for the dental restoration to be screwed directly to the laboratory analogue as the final step of the method. Alternatively, an abutment superstructure and/or implant superstructure can be mounted on the laboratory analogue and finalised.

Preferably, methods according to the invention can just as well provide for a computer to be used during the production of the recess or feed-through, in particular a digitisation of the oral space of the patient, whereby the shape of the recess is read-out from a memory unit of the computer and whereby different fitting shapes of recesses are assigned, in particular, to different laboratory analogues, whereby these are preferably selected by the computer and/or a user using an input unit.

Using a computer for production of the model results in a special combination effect in that all data for production of the model are already stored on said computer, which means that the surface of the model is stored therein. In this case, the surface of the model only needs to be modified appropriately such that the recess becomes arranged at the proper site thereof to match the laboratory analogue that is best suited or which has previously been selected by the computer or is the only one stored therein. The model can then be produced to have the modified surface right away, meaning jointly with the matching recess.

The invention can just as well provide for the use of a laboratory analogue that has the same rotational symmetry along its longitudinal axis, at least over regions thereof, as the recess and which preferably fits in the recess in a perfect fit or whose thread perfectly fits the counter-thread of the recess.

Using a laboratory analogue of this type ensures that the recess matches the region of the laboratory analogue and therefore ensures that the laboratory analogue is attached well in the model.

The invention can provide the recess to be predefined during the production of the model to have a fixed defined shape that matches a certain laboratory analogue, and/or a shape of the recess to be selected from a multiplicity of different shapes that match a multiplicity of different laboratory analogues, whereby the shape is being integrated as recess into a measured virtual digitised model of the jaw preferably before the model is produced.

This allows a particularly user-friendly and/or variable method to be designed. The strength of the invention can be implemented in beneficial manner especially through said options.

The use of computers for implementing methods according to the invention is particularly suitable, since especially the more recent methods are already in use in computer-supported manner for producing said models, such that there is only a need to include a simple software supplement and the data related to the surfaces of the recesses and/or laboratory analogues in order to improve the dental restoration thus produced.

In this context, the invention can provide multiple shapes of different recesses to be stored in the storage unit and one recess to be selectable through an input facility and/or to be defined by the computer based on model preparation data, whereby the recess, in particular, can be selected from a computer-determined pre-selection of recesses that match the laboratory analogues.

The object of the invention is also met by a laboratory analogue produced according to a method according to the invention for producing a laboratory analogue, in which the crestal end of the laboratory analogue corresponds to the data of the three-dimensional scan of the oral space of the patient at an accuracy of at least ±10 µm, preferably at an accuracy of at least ±5 µm, when it is inserted in a corresponding model of the jaw.

The object of the invention is also met by a model of at least a partial region of a jaw, produced according to a method of this type for producing a model, comprising at least one recess, in which the accuracy of the dimensions of the at least one recess and preferably the orientation and position of all recesses with respect to each other is at least ±10 µm, preferably the accuracy is at least ±5 µm, relative to the three-dimensional scanning data of the oral space of the patient such that the orientation and position of the crestal ends of the laboratory analogues inserted in the model corresponds to the orientation and position of all crestal ends of the dental implants at said accuracy.

And finally, the object of the invention is also met by a model of at least a partial region of a jaw, produced according to a method of this type for producing a model, comprising at least one feed-through and at least one recess, in which the accuracy of the position of the at least one feed-through and preferably the orientation and the position of all feed-throughs with respect to each other is at least ±10 µm, preferably the accuracy is at least ±5 µm, relative to the three-dimensional scanning data of the oral space of the patient such that the orientation and position of the crestal ends of the laboratory analogues affixed in the model by means of the pins extending through the feed-throughs corresponds to the orientation and position of all crestal ends of the dental implants at said accuracy.

A model of this type provides a basis for the use of a rotationally-fixed and even position-fixed superstructure for producing high quality dental restorations.

In this context, the invention can provide counter-snap-in means in the recess that engage snap-in means on the laboratory analogue and keep the laboratory analogue in a fixed position.

This again serves to affix a laboratory analogue inserted into the recess of the model both better and more accurately.

The possibility of using different laboratory analogues and the selection of a particularly well-suited laboratory analogues allow for further improvements to be made to the final result thus produced.

The invention is based on the surprising finding that the quality and especially the accuracy of the dental restoration produced with modern methods such as "rapid prototyping" and/or stereolithographic methods for producing jaw models can be improved through reproducing the accuracy of the scan in the model or laboratory analogue or laboratory analogues by utilising the scan data in the automatic shaping or ablating during the production of the model and/or during the production of the laboratory analogue or laboratory analogues. This can be effected according to the invention, preferably through the use of five-axis procedures such as five-axis polishers, mills, cutters and/or drills that are controlled based on the scan data of the oral space of the patient. In this context, various other measures according to the invention can allow the laboratory analogues to be arranged particularly positionally-precise, non-rotatably or even in fixed position.

The methods according to the invention allow not only the position of an individual crestal end of a single laboratory analogue to be defined accurately, but also, and mainly, the position and orientation with respect to each other of different crestal ends of multiple laboratory analogues to be adjusted accurately. This results in advantages during the production of superstructures that are to be attached to multiple dental implants.

Moreover, the recess can be produced to have the properly fitting shape right when it is produced in the jaw model if the surface required for the recess is integrated into a virtual model right away and each recess is generated right away accordingly during the production. Moreover, it is also feasible to right away select a particularly well-fitting recess with a matching laboratory analogue if multiple different laboratory analogues and the matching recesses are stored and thus are available for selecting.

BRIEF DESCRIPTION OF THE DRAWINGS

Exemplary embodiments of the invention shall be illustrated in the following on the basis of eight schematic figures, though without limiting the scope of the invention. In the figures:

FIG. 1 shows a laboratory analogue 1 that is well-suited for implementing a method according to the invention. The laboratory analogue 1 has a cylindrical base 2 that is fabricated from metal. The laboratory analogue 1 can be fabricated, for example, from metal. A hexagonal superstructure 3 is arranged on the top of the laboratory analogue 1.

Figure 1:
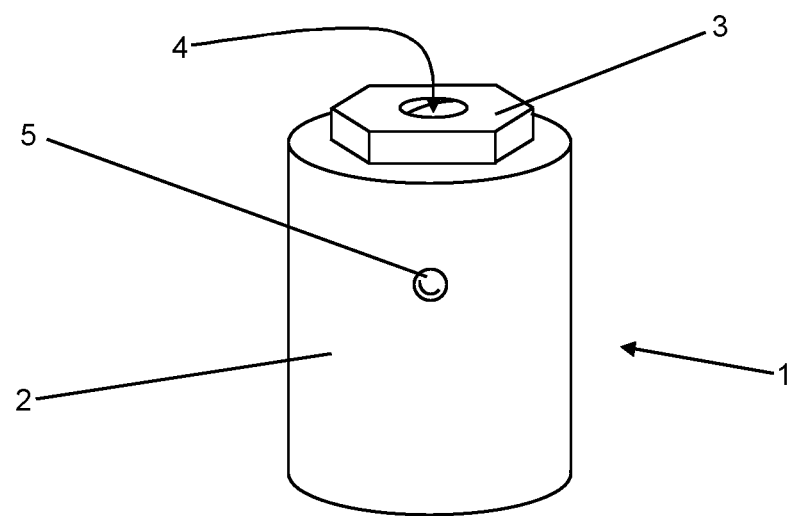
FIG. 1: shows a schematic perspective view of a laboratory analogue having a projection for forming a bayonet closure for implementing a method according to the invention.

If a laboratory analogue 1 or a sleeve with a hexagonal superstructure 3 is used, the abutment has on its base-side a 6-fold rotational symmetry, i.e. that the region and the surface of the abutment can be made to geometrically coincide with itself through six different rotations of less than 360° about its longitudinal axis. The term, abutment, can also be understood to mean an implant superstructure with connection geometry. A rectangular or elliptical superstructure would lead to 2-fold symmetry and can be used just as well. The abutment can therefore be placed on the laboratory analogue 1 at defined angles only.

A cylindrical hole 4 having an internal thread 4 is arranged in the centre of the laboratory analogue 1. The hole 4 extends deep into the inside of the base 2 and along the symmetry axis of the cylindrical base 2. But the hole 4 does not extend all the way to the opposite side of the laboratory analogue 1.

A projection 5 is attached on the jacket surface of the cylindrical base 2 and can take the shape of a semi-sphere. The projection 5 is to form a bayonet closure in concert with a corresponding recess in a jaw model of a patient.

Figure 2:
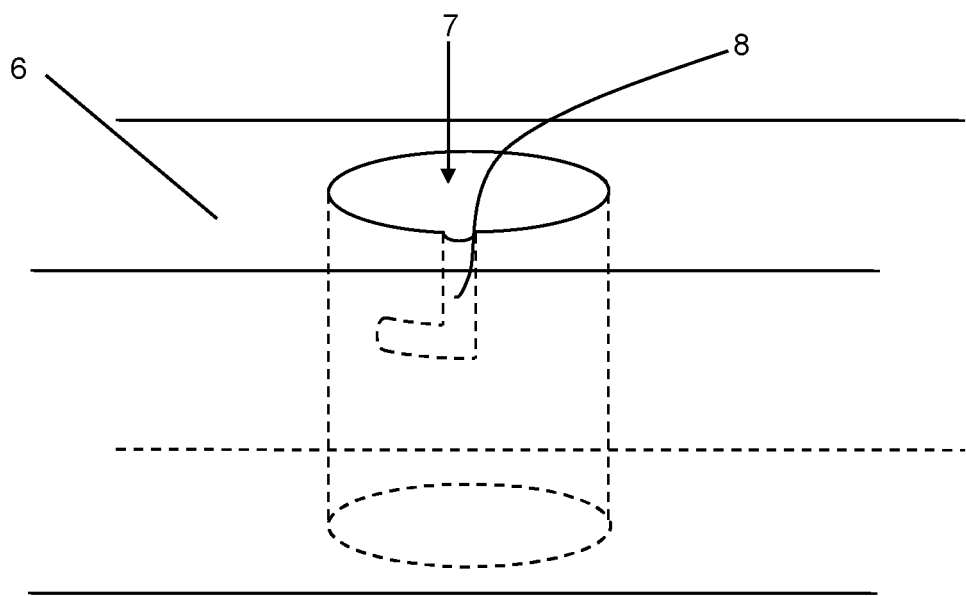
FIG. 2: shows a schematic perspective and transparent partial view of a jaw model for accommodating the laboratory analogue according to FIG. 1 for implementing a method according to the invention.

A part of a model 6 of this type is shown in a transparent schematic view in FIG. 2. The model 6 continues on the right and left as is indicated through the non-finalised straight lines in FIG. 2. In reality, the model 6 is not to have the type of edges shown through the straight lines, but shows an alveolar ridge with or without teeth depending on the actual situation in the oral space of the patient.

A recess 7 is situated in the model 6 and extends into the model 6 as a cylindrical hole. The diameter of the recess 7 is slightly larger than the diameter of the laboratory analogue 1 according to FIG. 1 such that the laboratory analogue 1 can be inserted into the recess. An angled groove 8 is provided in the cylinder wall of the recess 7 and forms a bayonet closure in concert with the projection 5 according to FIG. 1. The laboratory analogue 1 can be attached in said model 6 through inserting the laboratory analogue 1 into the recess 7, whereby the projection 5 is guided in the groove 7. The laboratory analogue 1 cannot be inserted further at the angling of groove 7, but is rotated clockwise until it reaches the limit stop of groove 7 and projection 5 blocks any further rotation.

The laboratory analogue 1 is fabricated from a sleeve (not shown) that is slightly longer than the laboratory analogue 1 shown, but already has the same diameter as the base 2 and has a hexagonal superstructure 3 and the projection 5. The sleeve is firmly connected to the model 6 by means of the bayonet closure 5, 8.

The sleeve is then milled off by means of a five-axis milling machine, whereby the five-axis milling machine is controlled automatically based on previously recorded three-dimensional scanning data of the oral space of the patient. In this context, the orientation and position of the crestal end of the sleeve are milled off at high accuracy such that said end corresponds very closely to the orientation and position of the crestal end of the dental implant in the jaw of the patient once it is milled off. Especially the position and orientation of multiple dental implants with respect to each other is reproduced very accurately in the model 6 in this process. The laboratory analogues 1 in the model 6 thus produced from the sleeves are then very well-suited for producing the superstructure, in particular a superstructure anchored on multiple dental implants.

In contrast, the model 6 can initially be produced through simple rapid prototyping since the inaccuracies in the production of the model are evened out later on through after-working with the five-axis milling machine.

Figure 3:
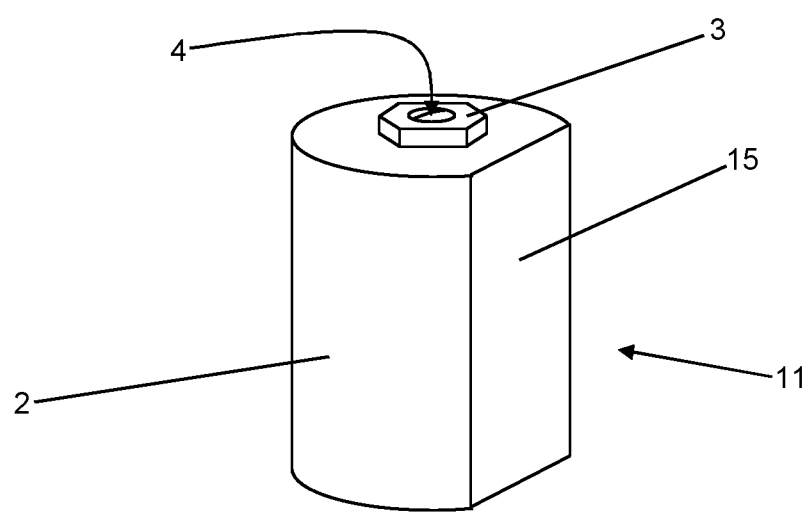
FIG. 3: shows a schematic perspective view of a sleeve with broken rotational symmetry for implementing a method according to the invention.
Figure 4:
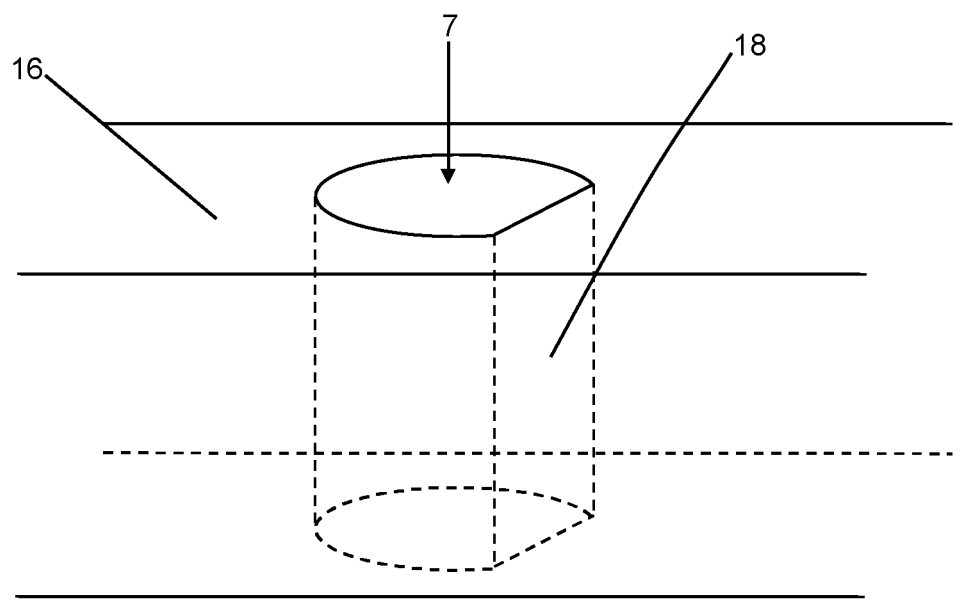
FIG. 4: shows a schematic perspective and transparent partial view of a jaw model for accommodating a sleeve according to FIG. 3 for implementing a method according to the invention.

FIG. 3 shows a schematic perspective view of a sleeve 11 for an alternative laboratory analogue that has a base 2 with a flat portion 15. The purpose of the flat portion 15 is to ensure that the sleeve 11 and the laboratory analogue fabricated from the sleeve 11 can be inserted into the matching model 16 according to FIG. 4 in one position only. The sleeve 11 also has a hexagonal superstructure 3 for orientation of an abutment and a hole 4 with an internal thread for attachment of the abutment. Accordingly, the sleeve 11 resembles the laboratory analogue 1 according to FIG. 1. Basically, it is conceiveble, although unlikely, that the unprocessed shape of the sleeve 11 would perfectly match the situation inside the oral space. In this case, the sleeve 11 could be used directly as laboratory analogue. This means that there is no fundamental difference between the sleeve 11 and the finished laboratory analogue. However, the sleeve 11 should usually be longer since it cannot be made longer artificially and needs to be milled off or ablated in any other manner to be able to produce laboratory analogues of any length from the sleeve 11.

The model 16 has a recess 7 which also comprises a flat portion 18 such that the shape of the recess 7 matches the shape of the base 2 of the sleeve 11. Once the sleeve 11 is inserted, a five-axis processing, preferably using a five-axis CNC milling machine, is used to fully automatically mill off the inserted sleeve 11 at its crestal end (on the top in FIG. 3). The five-axis CNC milling machine receives the data for this process from an electronic memory, in which the data of a scan of the oral space of the patient are stored. The situation in the oral space and, in particular, the position and orientation of all dental implants in the jaw of the patient to be treated are recorded at high accuracy during the scan (inaccuracy of less than 10 μm).

Whereas the model 16 was produced through rapid prototyping from the same data but at lower accuracy, ablation of the sleeves 11 through the more accurate five-axis processing allows laboratory analogues to be produced whose position and orientation correspond to the situation, in particular the position and orientation of the dental implants, in the oral space of the patient, at an accuracy of at least 10 μm. Especially where a superstructure is to be attached to multiple dental implants, the high accuracy of the present method is advantageous in order to prevent any tension exerted on the jaw by superstructures that have not been fabricated at sufficient accuracy in concert with the dental implants.

Figure 5:
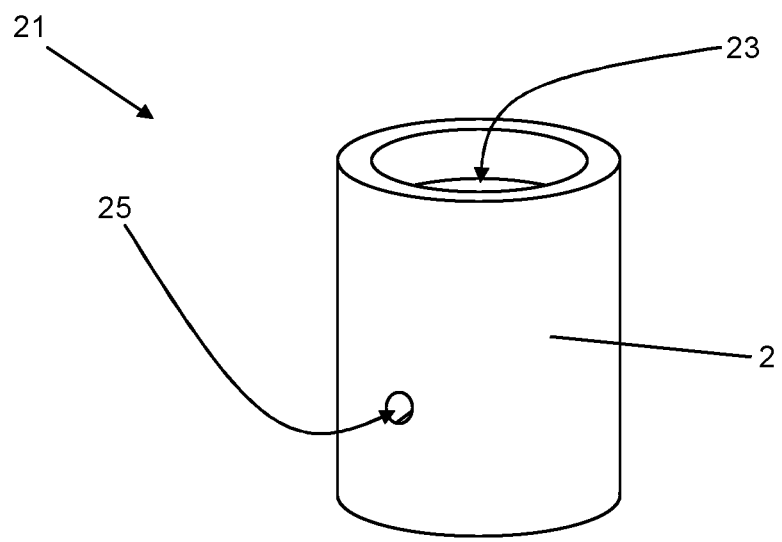
FIG. 5: shows a schematic perspective view of an alternative laboratory analogue for implementing a method according to the invention.

FIG. 5 shows a schematic perspective view of an alternative laboratory analogue 21 for implementing a method according to the invention. The laboratory analogue 21 has a cylindrical base 2 whose upper crestal end has a depression 23 provided on it. The depression 23 serves to accommodate an abutment for producing a superstructure to be inserted, for example, as a dental restoration or as a superstructure in the oral space of a patient on a dental implant having the same crestal end. A hole having an internal thread (not shown) for attachment of the abutment is situated in the depression 23. An accommodation opening 25 is provided in the cylinder jacket of the laboratory analogue 21 and opens into a cylindrical depression in the base 2 of the laboratory analogue 21.

The laboratory analogue 21 is a standard part, in which the position and orientation of the accommodation opening 25 and of the cylindrical depression in the jacket of the base 2 were fabricated at high accuracy, for example an accuracy of at least 6 μm.

Figure 6:
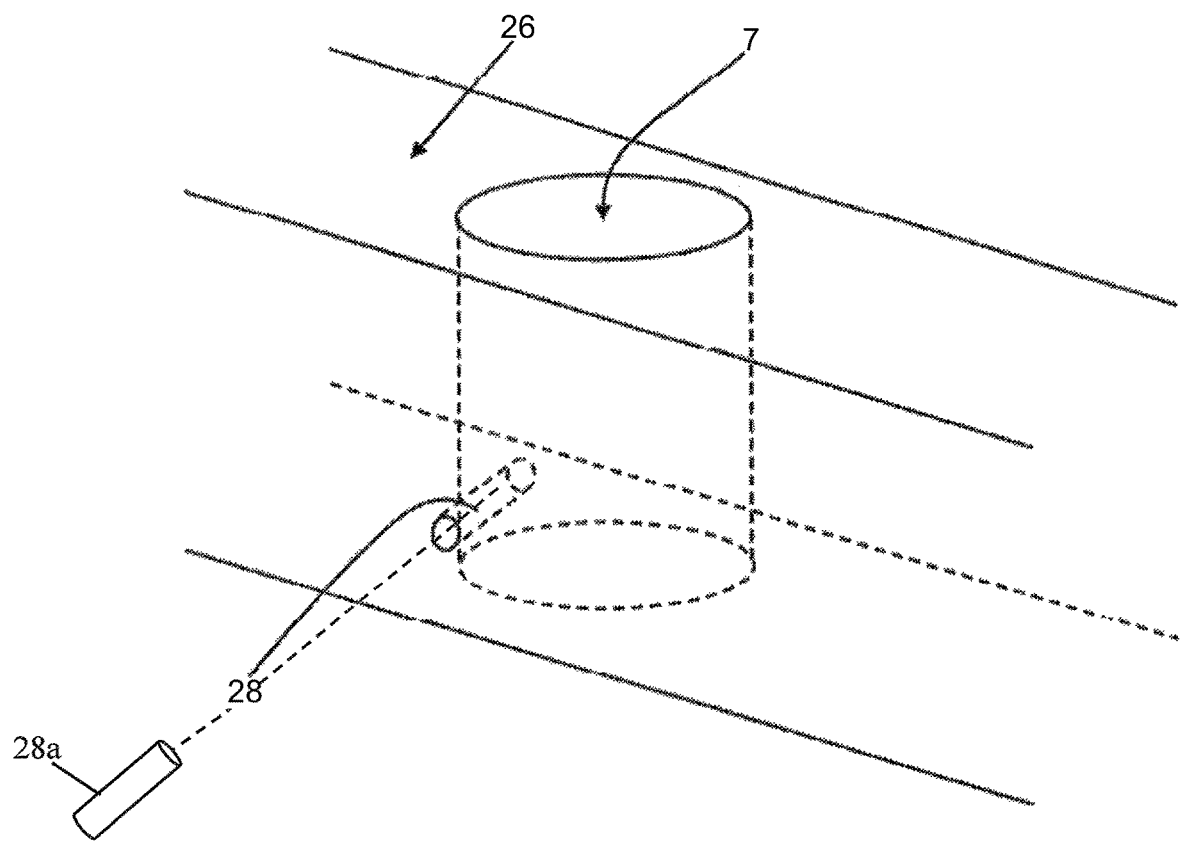
FIG. 6: shows a schematic perspective, transparent partial view of a jaw model having a feed-through for fixation of a laboratory analogue according to FIG. 5 for implementing a method according to the invention.

FIG. 6 shows a schematic perspective and transparent partial view of a jaw model 26 having a feed-through 28 for fixation of a laboratory analogue 21 according to FIG. 5 in a recess 7 of the model 26 for implementing a method according to the invention. The feed-through 28 has the same geometry as the cylindrical depression in the jacket of the base 2 of the laboratory analogue 21. The laboratory analogue 21 is to be inserted from above into the recess 7 such that the cylindrical depression in the jacket of the base 2 extends the feed-through 28. Subsequently, the laboratory analogue 21 can be affixed with a pin (not shown) that matches the geometry of the feed-through 28 and of the cylindrical depression in the jacket of the base 2 through inserting the pin through the feed-through 28 into the cylindrical depression in the cylinder jacket of the base 2.

A marking can be provided on the laboratory analogue 21 to indicate the position of the opening 25 in order to make it easier for the dental technician to insert the laboratory analogue 21.

The model 26 is initially fabricated without the feed-through 28 by means of rapid prototyping. This renders the accuracy of the model 26 to be approx. 60 μm (micrometers). In this context, the accuracy of the data used for fabrication of the model 26 by rapid prototyping is higher, for example up to 3 μm. The model 26 without feed-through 28 is then clamped and fixed in place in a bracket of a drilling machine or other facility for generating a feed-through 28 at high accuracy that allows for drilling at high accuracy, for example an accuracy at the level of the accuracy of the position of the cylindrical depression in the jacket of the base 2 in the laboratory analogue 21 (6 μm). A computer uses the data to calculate the position of the bore hole in order to position the laboratory analogue 21 upon fixation with the pin such that the position of the crestal end of the laboratory analogue 21 coincides with the position of the crestal end of the dental implant in the jaw of the patient. And lastly, the feed-through 28 in the model 26 is generated.

Likewise, any other feed-throughs in said model 26 (not shown), if applicable, are generated and the position and orientation of the crestal ends of the laboratory analogues 21 with respect to each other is thus adjusted appropriately such that these coincide with the position and orientation of the crestal ends of all dental implants in the jaw of the patient.

Figure 7:
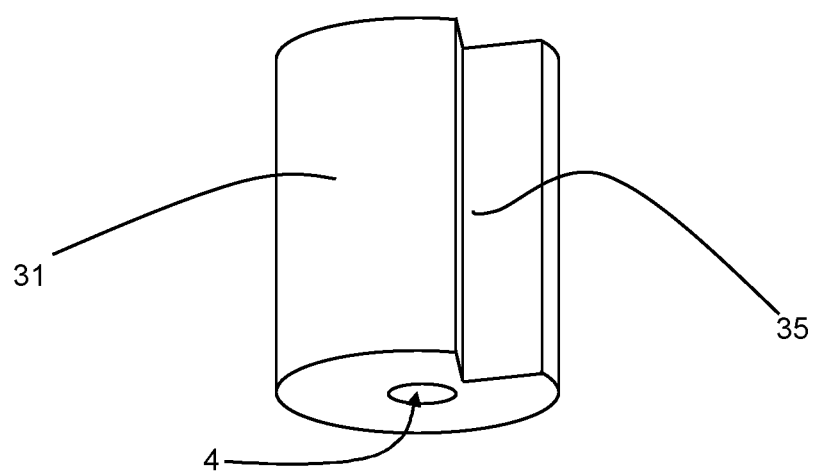
FIG. 7: shows a schematic perspective view of another laboratory analogue for implementing a method according to the invention.

FIG. 7 shows a schematic perspective view of another laboratory analogue 31 for implementing a method according to the invention. The laboratory analogue 31 is a cylindrical body having a groove 35. A hole 4 having an internal thread is provided along the cylinder axis of the laboratory analogue 31. An abutment can be screwed into the internal thread. The crestal end in FIG. 7 is situated on the bottom, unlike in FIGS. 1, 3, and 5.

Figure 8:
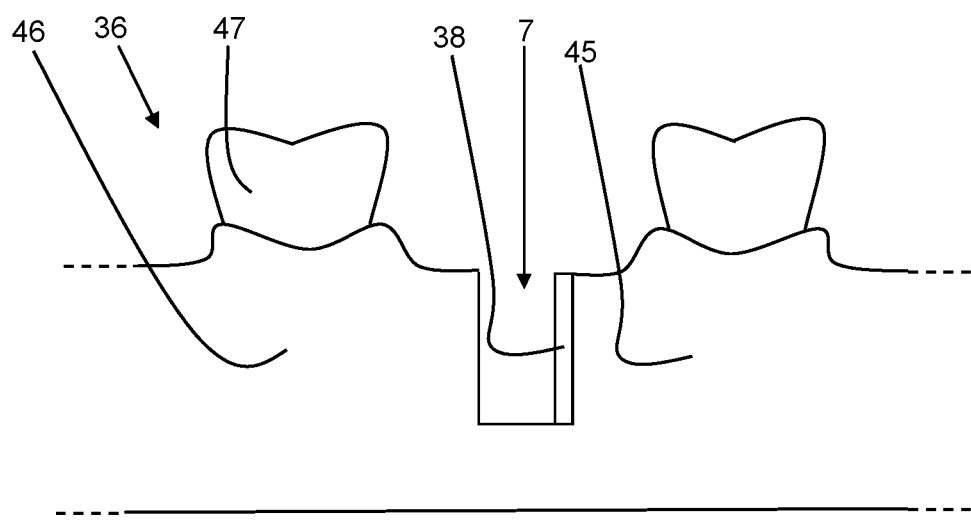
FIG. 8: shows a detail of a schematic cross-sectional view of a jaw model for implementing a method according to the invention.

FIG. 8 shows a schematic cross-sectional view of a detail of a jaw model 36 according to the invention. A recess 7 for accommodation of a laboratory analogue 31 is arranged in the model 36. As a matching counterpart to the laboratory analogue 31 according to FIG. 7, the model 36 comprises a projection 38 that fits in the groove 35 of the laboratory analogue 31 and thus unambiguously defines the position of the laboratory analogue 31.

The model 36 comprises gingiva 45, alveolar ridge 46, and teeth 47, or parts thereof to be exact. The model 36 is fabricated from plastic material and has been generated based on data obtained using a stereolithographic method by performing a scan of an oral space of a patient. The opposite part of the jaw (not shown) can also be part of the model 36 in order to be able to represent the situation upon mastication, for example with the mouth closed. Accordingly, the model 36 can continue not only on the right and left, as indicated through the dashed lines.

The model 36 comprises the recess 7 in the form of a cylindrical hole in a site between the teeth 47. The cylindrical rotational symmetry of the recess 7 is broken through the projection 38. This secures the exact position of a laboratory analogue 31, such as the one according to FIG. 7, in the model 36, against both rotation and positional change.

For a laboratory analogue 21 and/or a sleeve 11 as shown in FIG. 3 or 5, the recess 7 in a matching model would be built as a cylindrical hole with a flat portion or a feed-through through the gingiva 45 at the alveolar ridge 46, which would keep the laboratory analogue 21 and/or sleeve 11 in position safe against rotation. The advantage of said structure is that the laboratory analogue 31 can be taken out quickly, whereas the laboratory analogue 21 according to FIG. 5 can be fixed in place better and more accurately.

Another particularly preferred exemplary embodiment of a method according to the invention is illustrated in the following. Measurements of the oral space are made for production of a well-fitting dental restoration. For this purpose, a three-dimensional image of the oral space, and/or, in particular, the respective part of the jaw, is recorded. These data are then stored in a memory of a computer. During the recording, the positions of all dental implants in the jaw of the patient are defined accurately by inserting standard positional markers in the dental implants for the scan, whereby the markers can be identified unambiguously during the scan and render the position and orientation of the dental implants exactly defined by the scan.

These data are used to calculate a virtual three-dimensional CAD model of the jaw or of part of the jaw in a computing unit of the computer. Different recesses 7 or basic recess shapes are stored in the memory of the computer and are assigned to different laboratory analogues 1, 21, 31 and/or sleeves 11. The computer calculates how the various recesses 7 might be arranged in the model 6, 16, 26, 36. The most stable or most reasonable variant is selected or the most stable or most reasonable variants are proposed by means of a display facility. A criterion in this context can be, for example, how thick is the wall of the model 6, 16, 26, 36 in the region of the recess 7 in the alveolar ridge 46 for the various recesses 6, 16, 26, 36 or which is the most well-suited laboratory analogue 1, 21, 31 and/or sleeve 11 for the position in the jaw.

Alternatively, the user can select from all stored recesses 7 the one deemed most suitable. The invention can just as well provide the computer to indicate, based on a calculation, that a selected recess 7 is not feasible or not reasonable, for example is not stable enough, if applicable. Moreover, it is feasible that only one recess 7 is stored for a particular type of laboratory analogues 1, 21, 31 and/or sleeves 11.

Subsequently, the recess 7 selected by means of an input facility or the pre-determined recess 7 is combined with the virtual model of the jaw. For this purpose, the recess 7 is included in the calculation of the virtual model as a surface of the virtual model at the respective site at which the dental implant is arranged in the jaw of the patient. The new virtual model is then used to generate an actual model 6, 16, 26, 36 using known methods, such as, for example, rapid prototyping methods. For this purpose, the computer is connected to a manufacturing facility designed for implementing methods of this type.

Just as well, the recess 7 may not yet be included in the model 6, 16, 26, 36 or may be designed as a precursor, that is too small in size. The final shaping of the recess 7 is effected using a more accurate manufacturing method than rapid prototyping. Conceivable in this regard are five-axis processing methods that utilise the higher accuracy of the scanning data to generate the recess 7 and its position and orientation to each other at higher accuracy. Accordingly, recess 7 is subjected to precision processing such that the position, orientation, and depth of the recess 7 in the model and, if applicable, of the recesses with respect to each other are fabricated appropriately such that the crestal ends of the inserted laboratory analogues 1, 21, 31 coincide exactly with the orientations and positions of the crestal ends of the dental implants in the jaw and, if applicable, of the dental implants with respect to each other.

Accordingly, either the recess 7 can then be processed with a precision tool, for example through a five-axis processing, based on the more accurate scanning data or, alternatively, a feed-through can be drilled accurately in order to define the position and orientation of a prefabricated laboratory analogue 1, 21, 31 at high accuracy. Another alternative allows a sleeve 11 inserted in the recess 7 to be ablated, additionally or alternatively, with a precision tool, for example through a five-axis processing, based on the more accurate scanning data, in order to produce the exactly correct length and arrangement of the laboratory analogue 1, 21, 31 thus generated.

The actual dental restoration can then be generated on the superstructure 3 of the laboratory analogue 1, 21, 31 in a realistic environment and in accurate position. Whenever the laboratory analogue 1, 21, 31 or the sleeve 11 is removed from or re-inserted into the model 6, 16, 26, 36, it will be situated in the same position in the jaw model 6, 16, 26, 36. This ensures that the dental restoration has the exactly correct shape. Moreover, the dental restoration will also be arranged in the same position in the oral space of the patient on the actual dental implant such that a particularly good fit is guaranteed.

The features of the invention disclosed in the preceding description and in the claims, figures, and exemplary embodiments, can be essential for the implementation of the various embodiments of the invention both alone and in any combination.

LIST OF REFERENCE NUMBERS 1, 21, 31 Laboratory analogue
2 Base
3 Superstructure
4 Hole
5 Projection
6, 16, 26, 36 Model
7 Recess
8 Groove
11 Sleeve
15 Flat portion
18 Flat portion
23 Depression
25 Accommodation opening
28 Feed-through
35 Groove
38 Projection 45 Gingiva
46 Alveolar ridge
47 Tooth

We claim:

1. A method for producing a laboratory analogue for dental implants, said method comprising the steps of:
   providing at least one sleeve comprising a cylindrical depression having an internal thread;
   providing a three-dimensional model of at least a partial region of a jaw of a patient who harbors at least one dental implant;
   inserting at least one sleeve into at least one recess of the model matching the sleeve, each recess being arranged in a region of the model, in which a dental implant is arranged in the jaw of the patient; and
   fully-automatic ablation of the at least one inserted sleeve to produce a laboratory analogue from the sleeve, wherein the ablation is controlled through three-dimensional scanning data of an oral space of the patient, wherein the data was recorded previously, and wherein the sleeve is ablated based on such data to the extent that a crestal end of the laboratory analogue produced from the sleeve coincides with a crestal end of the dental implant in the jaw of the patient.

2. The method according to claim 1, wherein the sleeve is ablated proceeding from a crestal direction.

3. The method according to claim 1, wherein the three-dimensional scanning data of the oral space of the patient is used in the production of the three-dimensional model of the region of the jaw.

4. The method according to claim 1, wherein the three dimensional model of at least a partial region of a jaw for producing a dental restoration is produced by a method comprising the steps of:
   providing data of the three-dimensional scan of the oral space of the patient who harbors at least one dental implant, wherein the data was recorded previously;
   preparing a three-dimensional model of at least the partial region of the jaw based on the data; and
   fully-automatic shaping of at least one recess for accommodating the laboratory analogue into an alveolar ridge of the model,
   wherein the data is utilized for the fully-automatic shaping.

5. The method according to claim 4, wherein a depth, a position, and an orientation of the at least one recess are shaped such that a crestal end of the laboratory analogue inserted into the recess coincides with a crestal end of a dental implant in the jaw of the patient, wherein the laboratory analogue is produced from the sleeve through ablation, and wherein the three-dimensional scanning data is used to ablate the sleeve fully-automatically.

6. The method according to claim 4, wherein the fully-automatic shaping proceeds by drilling, turning, grinding, cutting out and/or milling.

7. The method according to claim 3, wherein the three-dimensional model of at least a partial region of a jaw for producing a dental restoration is produced by a method comprising the steps of:
   providing data of the three-dimensional scan of the oral space of the patient who harbors at least one dental implant, wherein the data was recorded previously;
   preparing a three-dimensional model of at least the partial region of the jaw with at least one recess for accommodating the laboratory analogue having an opening, wherein each recess is arranged in a region of the model in which a dental implant is arranged in the jaw of the patient; and
   fully-automatic shaping of at least one vestibular, lingual or palatinal feed-through through the model into the at least one recess utilizing the data, the feed-through being arranged such that a crestal end of one laboratory analogue coincides with a crestal end of the dental implant in the jaw of the patient when the laboratory analogue is fixed in place with a pin that is inserted through the feed-through in the model into the opening in the laboratory analogue.

8. The method according to claim 7, wherein the feed-through and the opening are shaped to match the pin, the opening opens into a depression in the laboratory analogue, and a geometry of the depression matches a geometry of the pin.

9. The method according to claim 7, wherein the fully-automatic shaping proceeds by drilling, turning, grinding, cutting out and/or milling.

10. The method according to claim 1, wherein the fully-automatic ablation is carried out in computer-supported manner at an accuracy of ±10 μm.

11. The method according to claim 1, wherein the model is produced by rapid prototyping at an accuracy of ±100 μm.

12. The method according to claim 1, wherein a CAD-based stereolithographic method is used to obtain the data for production of the model and/or the laboratory analogue, and wherein the model is fabricated from a plastic material.

13. The method according to claim 1, wherein a five-axis processing is used in the ablation.

14. The method according to claim 1, wherein at least two recesses are generated or exist in the three-dimensional model and one sleeve each or one laboratory analogue each is configured to be inserted into each of the recesses, and wherein the position of the recess or feed-throughs and/or crestal ends of the laboratory analogues with respect to each other are adjusted by means of shaping and/or ablating based on the scanning data.

15. The method according to claim 1, wherein at least one cylindrical or conical recess is generated or exists in the model, wherein the recess is generated or exists to have a one-fold or n-fold rotational symmetry about a longitudinal axis of the recess, and wherein a sleeve or a laboratory analogue with the same rotational symmetry at least over regions thereof is configured to be inserted into the recess such that it fits in the recess only in one orientation or in the n-fold orientation.

16. The method according to claim 1, wherein the at least one recess is predefined during the production of the model to have a fixed defined shape that matches a certain shape of the sleeve or the laboratory analogue, and/or a shape of the recess is selected from a multiplicity of different shapes that match a multiplicity of different sleeves or laboratory analogues, wherein the shape is integrated into a measured virtual digitized jaw model as the recess before the model is produced.

* * * * *